June 29, 1954  R. H. DEITRICKSON  2,682,257
FLUID OPERATED ENGINE FOR DOWNWELL PUMPS
Filed July 7, 1952  5 Sheets-Sheet 2

INVENTOR
Roy H. Deitrickson
BY Owen & Owen
ATTORNEYS

Patented June 29, 1954

2,682,257

UNITED STATES PATENT OFFICE 2,682,257

FLUID OPERATED ENGINE FOR DOWNWELL PUMPS

Roy H. Deitrickson, Toledo, Ohio, assignor to The National Supply Company, Pittsburgh, Pa., a corporation of Pennsylvania Application July 7, 1952, Serial No. 297,473

17 Claims. (Cl. 121—150)

This invention relates to a fluid operated engine for a downwell pump. A pump of this class is positioned at or near the bottom of a deep well tubing for pumping fluid from a relatively great depth and is operated by working fluid, under pressure originating in equipment on the surface of the ground and conveyed to a fluid engine disposed in the tubing and operatively connected to the pump. Since the pressure fluid control valving in the fluid engine must operate with great regularity over long periods of time, it must be highly positive in its action and must be so arranged that collection of sand and the like in the associated pump cannot cause operation to stop.

In general, pumps of this character have been designed so that the stroking motion of the engine piston is relied on to cause reversal of the engine piston, either by reason of piston-carried valves overrunning certain ports, or by reason of the piston making contact with certain valve operating rods. In none of the prior devices with which I am familiar is hydraulic pressure alone utilized to cause shifting of the valve parts. The present invention has for its primary object the provision of means to take advantage of certain changes of pressure of motive fluid to cause reversal of movement of the engine piston by shifting the control valving. The fluid engine of the present invention thus makes it possible to utilize identical valving for operating pumps having many different lengths of stroke. The valving may thus be conveniently made as a short unit to be attached to the top of an engine cylinder.

It has also been generally proposed to make the control valving as an extension of the engine piston so that the valving functions when it is carried over certain ports at the top and bottom of the engine piston stroke. The valves thus are required to fit very closely against the stationary parts which makes it necessary to machine the parts to great accuracy over long distances. Further, in prior pump valving of this character the passages through which the fluid is directed are small in diameter and thus seriously limit the capacity of the pump by reason of the time required to fill and empty the engine cylinder.

In an engine according to the present invention sleeve valves are eliminated, and tubular interfitting parts having only one diametral fit are used, which greatly simplifies the manufacturing problems. In accordance with one of its objects, the present invention thus greatly reduces the number and extent of the surfaces requiring highly accurate machine work.

In many of the pumps previously available the assembly has been so complex that servicing in the field has been virtually impossible and the practice has been to substitute a new unit for the defective one whenever pumping stopped for reasons clearly attributable to the pump. The defective pump has usually been taken to the original manufacturer for repair. One of the objects of the present invention is to so simplify the construction and assembly of the parts that repairs may be made in the field without the use of specialized equipment.

It is yet another object of this invention to provide a valving mechanism for an hydraulically operated downwell pump in which a control element is so designed as to be biased toward a position effectuating movement of the valving in one direction by reason of hydraulic differentials acting on the control element and to remove the biasing force of the control element from the valving and permit the establishment of a force on the valving to provide for movement of the valving in the opposite direction appropriate to accomplish a reversal of the valving connections and consequently of the direction of movement of the engine and the pump pistons.

It is a still further object of this invention to provide a valving mechanism so integrated with the reciprocatory movement of the pump engine piston that "reversals," i. e., changes in direction of movement of the engine piston at its stroke extremities, are caused by hydraulic pressure in response to the approach of the engine piston to the extremities of its stroke, whereby even under adverse operating conditions such as the presence of a gas pocket, the engine piston will not be driven forcefully against the ends of the cylinder in which it reciprocates.

Yet another object of this invention is to provide a control element for the valving system of an hydraulically operated downwell pump in which the control element anticipates the need for changes in the position of the valving, i. e., the connection or release of power fluid to the engine piston, by responding to changes in the pressure of exhaust fluid from the engine piston.

Another important object of this invention is the provision of a control element in the valving system of an hydraulically actuated downwell pump which acts as a governor for the speed of operation of the engine cylinder and, therefore, the strokes per minute of the pump, preventing the occurrence of excessively high speed or "racing" strokes which might damage the pump, engine or valving mechanism.

Other objects and advantages of the present invention will become apparent from the following detailed description of the construction and operation of a preferred form of the invention, reference being had to the accompanying drawings in which.

In describing the structure of a pump embodying the invention as illustrated in the drawings the consideration of the pump will be divided into three mechanical sections, viz., the production fluid pump (Fig. 3), the pump engine (Fig. 2), and the control valve mechanism (Figs. 1 and 4-8, inclusive).

In describing the operation of a pump embodying the invention the operation of the production fluid pump will be set forth following its mechanical description and the operation of the engine will be set forth following its mechanical description. The operation of the valving mechanism will, in turn, be broken down into a description of the operation of the valving mechanism during the downstroke (Figs. 1 and 7); its operation at bottom reversal (Fig. 4); its operation during the upstroke (Figs. 5 and 8); its operation at the time of top reversal (Fig. 6); and the overall control of the pump by means of which certain elements of the mechanism cooperate to govern the speed of operation and to prevent undesirable "racing" strokes from taking place when gas enters the pump or when other changes in operating conditions occur.

Figure 3:
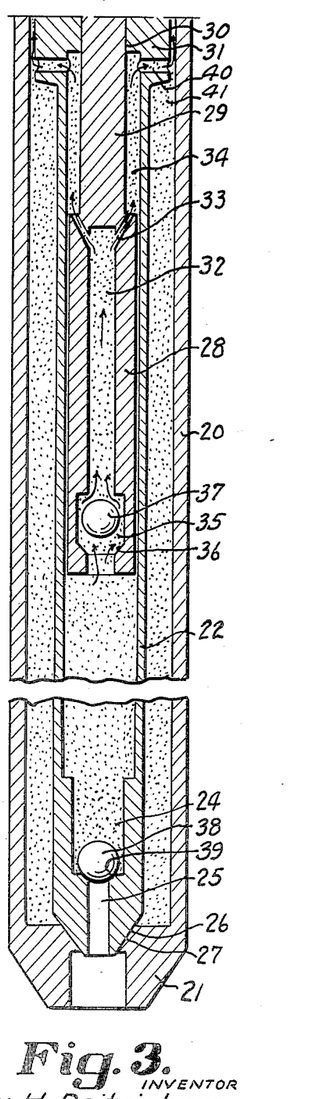
Fig. 3 is a view similar to Figs. 1 and 2 but of the lowermost portion of a pump embodying the invention and illustrating the production fluid pumping cylinder, being, in turn, a continuation of Fig. 2 and showing the next lower section of a pump embodying the invention.

The first section of a device embodying the invention is the pump itself which may be of any suitable form. In Fig. 3 a well tubing 20 having a pump seat and packer fitting 21 is shown as extending downwardly into the production area of a well. The pump consists of a tubular pump cylinder 22 which is concentric with the well tubing 20 and which is seated on the packer 21. At the end of the pump cylinder there is a cylindrical valve chamber 24 that connects with an axial intake opening 25. For fitting the parts together, the lower end of the pump cylinder 22 may be turned down to form a cone end 26 which seats in an axial cone socket 27 in the packer 21.

A pump piston 28 is located in the interior of the cylinder 22 and is secured on the lower end of a piston rod 29 which extends axially into the cylinder 22 through a coaxial bore 30 in a connector 31 which is functionally integral with the pump cylinder 22. The pump piston 28 is axially bored to form a duct 32 that is connected by a plurality of circumferentially spaced passageways 33 with a space 34 at the top of the pump cylinder above the piston 28. At the lower end of the piston 28 its central duct 32 is enlarged to form a valve chamber 35 with a cone seat 36 at its lower end. A travelling valve in the form of a ball check 37 rests on the cone seat 36 during the upward strokes of the pump piston 28 but moves away from its seat into the chamber 35 during the down stroke of the pump piston to permit the passage of production fluid.

A standing valve located at the lower end of the valve chamber 24 consists in a ball 38 and a seat 39 which is formed in the packer fitting between the valve chamber 24 and intake opening 25. The interior of the pump cylinder is connected through a group of radially extending openings 40 to a production fluid conduit 41 formed by the annular space surrounding the pump cylinder 22 between its walls and the walls of the well tubing 20.

PUMP OPERATION

The pump section of the modification of the invention illustrated in the drawings is a single action pump. As will appear when the operation of the engine and valve sections of the device are described, any type of reciprocatory pump may be employed and the choice of a single action pump as illustrative is not a limitation on the scope or construction of embodiments of the invention. When the pump piston 28 is moved upwardly during an intake stroke, the standing valve ball 38 is lifted from its seat 39 and production fluid flows inwardly through the intake opening 25 filling the pump cylinder 22 beneath the piston 28 at its rises.

After the piston 28 has reached the top of its stroke, its direction of movement is reversed and it starts down. This action applies pressure on the oil located in the cylinder 22 beneath the piston 28 which seats the standing valve ball 38 in its seat 39 preventing the escape of production fluid in the cylinder 22 out of the intake opening 25. This same movement of the piston 28 unseats the travelling valve 37 from its seat 36 and the downward stroke of the piston 28 thus consists in a movement of the piston 28 through the body of fluid in its cylinder 22, in effect moving the fluid through the duct 32 from beneath the piston 28 to above the piston 28.

After the piston 28 has moved to the bottom of its cylinder 22 and starts upwardly again, the travelling ball valve 37 is seated and all of the fluid which has been transferred into the space 34 above the piston 28 is moved out through the radial openings 40 into the annular production fluid discharge conduit 41 surrounding the connector 31.

The reciprocation of the pump piston 28 fills the cylinder 22 on one upstroke, and at the same time discharges the production fluid transferred to the space above the piston 28 which was drawn into the pump during a previous upstroke.

PUMP ENGINE

Figure 2:
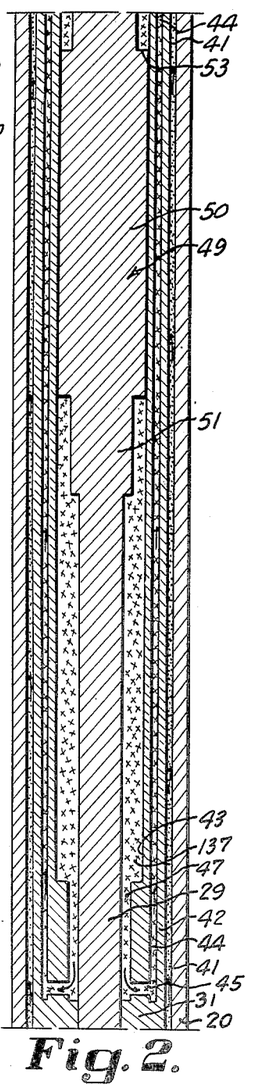
Fig. 2 is a view similar to Fig. 1 and is a continuation thereof with a small overlapping portion at the upper end of Fig. 2 and the lower end of Fig. 1, and shows the engine cylinder portion of a downwell pump embodying the invention, i. e., that section of the pump next below that shown in Fig. 1.

The second section of a device embodying the invention consists in the engine section which is shown in Fig. 2. In the engine section of the device the connector 31 to which the pump cylinder 22 is attached at the bottom, is constructed to receive two concentric spaced tubes forming an engine casing 42 and an engine cylinder 43. The exterior engine casing 42 is spaced from the interior of the well tubing 20 to form a continuation of the annular production fluid conduit 41. The inner engine cylinder 43 is concentric with and spaced inwardly from the engine casing 42, thus forming a second annular conduit 44 which extends along the entire length of the engine cylidner 43 for the purpose of introducing power fluid into the interior of the engine cylinder 43 near the lower end thereof. The annular conduit 44 communicates through a plurality of radial openings 45 with the interior of the engine cylinder 43. The upper end of the piston rod 29 extends coaxially into the cylinder 43 from the bore 30 in the connector fitting 31. The engine cylinder is of the same diameter throughout its length except for a reduced diameter sump 47 that is located just above the radial power fluid openings 45 at the bottom of the engine cylinder 43 and an upper reduced diameter pocket 48 at the upper end of the engine cylinder 43.

An engine piston 49 having a suitably packed and elongated main body section 50 slidingly fits the interior diameter of the engine cylinder 43 and reciprocates therein. The piston rod 29 is operatively connected to the lower end of the piston 49 and has an enlarged section 51 at its upper end which has an outside diameter loosely fitting the interior diameter of the cylindrical sump 47 at the bottom of the engine cylinder 43. The piston rod section 51 has an axial length equal to the axial length of the sump 47 above the radial power fluid inlet openings 45.

At the upper end of the engine piston 49 a cylindrical extension 52 of reduced diameter extends axially from the main body 50 of the piston 49. The extension 52 has an outside diameter which slidingly fits into the interior of the pocket 48 of the cylinder 43. The length of the extension 52 is less than the axial length of the pocket 48. An annular shoulder 53 steps the outer diameter of the piston body 50 down to that of the extension 52.

ENGINE PISTON OPERATION

It will be observed in Fig. 2 that the operating area of the upper end of the engine piston 49 is the total of the area of the end of the extension 52 and the annular shoulder 53, i. e., the entire cross sectional area of the piston body 50. The effective operating area of the lower end of the piston 49 is the difference between the area of the main body 50 and the cross sectional area of the piston rod 29. Thus the effective top area of the piston 49 is substantially greater than the effective bottom area of the piston 49. Therefore, if working fluid at the same pressure is admitted simultaneously above and below the piston 49, the piston will move downwardly. This is, in fact, the way in which the engine piston 49 is moved to effect a downstroke and, through the connecting piston rod 29, a downstroke of the pump piston 28.

Upward strokes of the engine piston 49 and thus of the pump piston 28 are achieved by the pressure differential between the fluid above and below the piston 49 rather than by an area differential. When the piston 49 is to be moved upwardly the interior of the engine cylinder 43 above the piston 49 is vented, through valving means to be described below, either to the production fluid discharging conduit 41 or, if desired, to a separate power fluid exhaust line. Power fluid under the same working pressure is still connected, however, through the inlet openings 45 and thus applies a constant high pressure on the lower end of the piston 49 to drive the piston 49 upwardly expelling the spent working fluid located above the piston 49 to the discharge as mentioned.

The presence of high pressure power fluid in the engine cylinder beneath the piston 49 at all times, i. e., both during up and down strokes, simplifies the valving in a downwell pump embodying the invention by eliminating any necessity for alternately charging and venting the lower end of the engine cylinder 43. Presence at all times of high pressure power fluid beneath the piston 49 also provides for the escape of a slight film of this fluid around the piston 49 between its exterior surface and the interior of its cylinder 43 for the purpose of lubricating the piston 49. This same thin film of power fluid may also escape around the piston rod 29 where it passes through the bore 30 in the connector 31 between the pump and engine portions of the device. The cleaning flow of power fluid around the piston rod 29 effectively prevents the ingress of any production fluid or solids carried thereby into the interior of the engine cylinder 43.

VALVE MECHANISM

The general construction of the valve mechanism section of a downwell pump embodying the invention is shown in Fig. 1 and Figs. 4–8, inclusive. A comparison of Figs. 1 and 2 will show that a portion of the upper end of the engine casing 42 and engine cylinder 43 is shown in both figures. At the upper end of the reduced diameter pocket 48 there is an axial bore 54 through which extends the lower end of a tubular valve stem 55. A series of longitudinally extending passageways 56 are drilled through the walls of the cylinder 43 around the pocket 48 connecting the interior of the cylinder 43 above the piston 49 with a lower pocket 57 in a flow chamber 58 located at the lower end of the valve section of a pump embodying the invention. The lower ends of the passageways 56 all terminate at an annular shoulder 59 extending between the reduced diameter pocket 48 of the engine cylinder 43 and the main wall of the engine cylinder 43. The lower ends of the passageways 56 thus are in line with the annular shoulder 53 on the engine piston 49.

Figure 1:
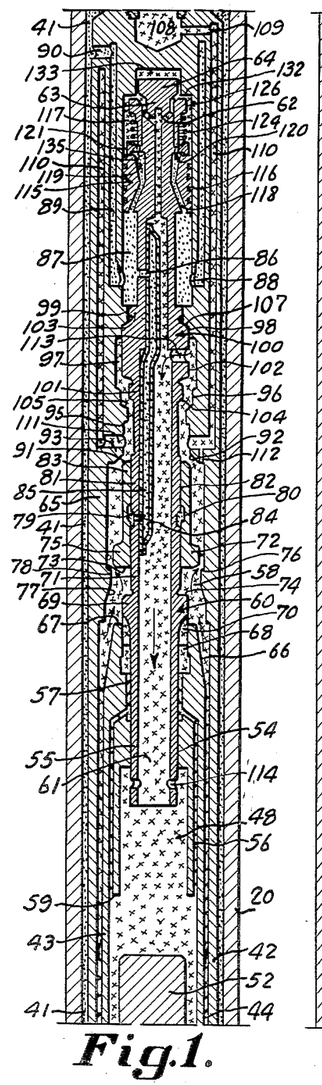
Fig. 1 is a vertical sectional view of the upper end and in particular of the valve chamber of an hydraulically operated downwell pump embodying the invention, showing the valve mechanism in the position assumed during the downstroke of the pump engine and the associated pumping piston.

The valve stem 55 is operatively integral with a sliding valve body generally indicated at 60 which has a varying external contour formed by shoulders and seats and different external diameters. The valve body 60 has an axial bore 61 extending from the lowermost end of the valve stem 55 through the body 60 to its upper end and terminating in a group of angularly directed circumferentially spaced orifices 62 which surround a stem 63 of a valve head 64.

The valve mechanism operates within a generally tubular valve casing 65 spaced inwardly from the well tubing 20, the annular space therebetween being a continuation of the production fluid conduit 41. The valve casing 65 is structurally a continuation of the engine casing 42 and surrounds the upper end of the engine cylinder 43 which is tapered as at 66 and which terminates in a flat annular lip 67 lying in a plane perpendicular to the axis of the mechanism.

Just above the pocket 57 the upper end of the engine cylinder 43 (interiorly of the taper 66) is counterbored to form a slightly enlarged chamber 68 which surrounds the valve stem 55. The chamber 68 has an internal diameter that is a close sliding fit with a larger cylindrical portion 69 of the valve body 60. Axial slots 70 are milled through the shoulder between the stem 55 and the valve portion 69 of the valve body 60 to provide for the axial passage of fluid from chamber 68 when the valve 69 is opened.

Immediately above the cylindrical portion 69 of the valve body 60, the diameter of the valve body 60 is reduced forming a short cylindrical section 71 on which a control collar 72 is slidably mounted. At its lower end the collar 72 has a radially extending annular shoulder 73 which, in certain positions, abuts against an opposed annular shoulder 74 formed by the enlarged cylindrical section 69 of the valve body 60.

The collar 72 has an enlarged diameter cylindrical rim 75 at its lower end. The outside diameter of the rim 75 is slightly smaller than the inside diameter of a land 76 formed on the inner surface of the valve casing 65 at the upper side of a conical wall 77 and just below a cylindrical wall 78 which has an internal diameter substantially larger than that of the exterior of any portion of the collar 72.

Just above the cylindrical section 71 of the valve body 60, an annular groove 79 is cut in its outer surface. The annular groove 79 is associated with and overlappingly mates a similar groove 80 cut in the inner surface of the collar 72. Above the annular grooves 79 and 80 the valve body 60 has a cylindrical section 81 having a diameter less than that of the cylindrical section 71 of the valve body 60. The inner bore of the collar 72 has a mating reduced diameter portion 82 which fits and slides on the reduced diameter section 81 of the valve body 60.

Because of this difference in the diameters of the two sections 71 and 81 of the valve body, the effective area at the lower end of the collar 72 is less than the effective area of the upper end 83 of the collar 72. This results in a pressure differential between the two ends of the collar 72 tending to move the collar 72 downwardly into engagement with shoulder 74 when power fluid is present in the flow chamber 58 surrounding the collar 72 and acting with equal pressure upon both of its ends.

The annular grooves 79 and 80 are made necessary by the change in diameters of the valve body sections 71 and 81 and the corresponding change in the diameters of the two mating inner surfaces of the collar 72. Because relative movement between the collar 72 and valve body 60 is necessary, the change in diameter must be carried out over an axial distance sufficient to permit such axial movement and, therefore, the annular grooves 79 and 80 have substantial axial length.

Because high pressure power fluid always is present in the flow chamber 58 surrounding the collar 72, some of such fluid leaks between the collar 72 and valve body 60 into the annular grooves 79 and 80. Because of this and the fact that the volume of the chamber formed by the annular grooves 79 and 80 changes with axial movement of the control collar 72, fluid must be allowed to flow in and out of the space formed by the grooves 79 and 80. The grooves 79 and 80 are connected by a radial opening 84 to a conduit 85 extending along the axial bore 61 in the valve body 60 and communicating with a second radial opening 86 which leads to an exhaust chamber 87 at the upper end of the valve body 60. The chamber 87 is connected by radial openings 88 with an annular exhaust duct 89 that is connected by large radial ports 90 with the production fluid conduit 41 surrounding the valve casing 65 and inside the well casing 20. The system comprising the radial ports 90, exhaust duct 89, chamber 87, conduit 85 and annular grooves 79 and 80 is constantly connected to the production fluid conduit 41 at low pressure. High pressure power fluid never enters this portion of the structure. If desired, ports 90 can be connected to a separate power oil return line leading to the suction side of a power oil pump at the surface of the well.

The collar 72 has a beveled shoulder 91 on its upper end 83 which opposes a beveled shoulder 92 formed on a lip 93 at the upper end of the wall 78 and which thus delineates the upper end of the flow chamber 58 within the wall 78. The innermost diameter of the lip 93 is less than the outer diameter of the main body of the collar 72, and the opposed shoulders 91 and 92 thus cooperate to restrict or open an annular variable orifice at the top of the control collar flow chamber 58.

Above the collar 72 the valve body 60 again is reduced in diameter and extends through a neck in the valve casing formed by a lower shoulder 95 of lesser diameter and an upper shoulder 96 of greater diameter. Above the shoulders 95 and 96 the casing 65 is formed to provide a spool valve chamber 97. The chamber 97 has an upper neck similarly formed by stepped shoulders 98 of greater diameter and 99 of lesser diameter.

A main spool valve 100 is formed or mounted on the valve body 60 and located within the spool valve chamber 97. The main spool valve has a lower extension 101 cooperating with the shoulder 95 and a main cylindrical surface 102 which has a close sliding fit with the cylindrical shoulder 96 when the spool valve 100 is in its lower position. A similar relationship exists between an upper extension 103 and the uppermost shoulder 99 and between the sliding valve surface 102 and the shoulder 98.

Between the extension 101 and main surface 102 the spool valve 100 has a beveled surface 104 which mates with a beveled seat 105 between the lower shoulders 95 and 96. Similarly an upper beveled surface 106 on the spool valve 100 mates with a beveled seat 107 connecting the upper shoulders 98 and 99.

In those installations where the present invention is set as a fixed pump, a power fluid connection 108 leads to radial ports 109 at the upper end of the valve casing 65 which connect to an annular power fluid conduit 110 spaced outside the annular escape duct 89. A plurality of radial ports 111 which extend into the interior of the casing 65 just above the lip 93, connect the lower end of the annular conduit 110 with the interior of the valve mechanism above the collar chamber 94 and power fluid is thus constantly available at the lower side of the main valve 100 and thus at the upper end of the flow chamber 58. An axial bleeder passageway 112 is drilled through the lip 93 between one of the ports 111 and the upper end of the flow chamber 58 for fluid bleeding as will be later described.

The central bore 61 of the valve body 60 communicates with the main spool valve chamber 97 through one or more radial ports 113 and with the interior of the engine cylinder 43 above the piston 49 through its open end at the lower end of the valve stem 55 and through a plurality of radial openings 114 through the walls of the valve stem 55 just above its lower end.

Near the upper end of the valve body 60, a balancing piston 115, which is provided with several packing rings 116, is mounted on or integral with the valve body 60 and movable within the chamber 87. The balancing piston 115 is sealed by the packing rings 116 against the wall of the chamber 87 because at certain points in the cycle of operations it acts as a movable wall between low pressure fluid in the chamber 87 beneath the piston 115 and high pressure fluid in a chamber 117 above the piston 115. A plurality of bleeder holes 118 and connecting slots 119 extend longitudinally through the balancing piston 115 and terminate just below a disk-like flange 120 on the valve body 60. The flange 120 is spaced axially from the top of the piston 115.

Figure 9:
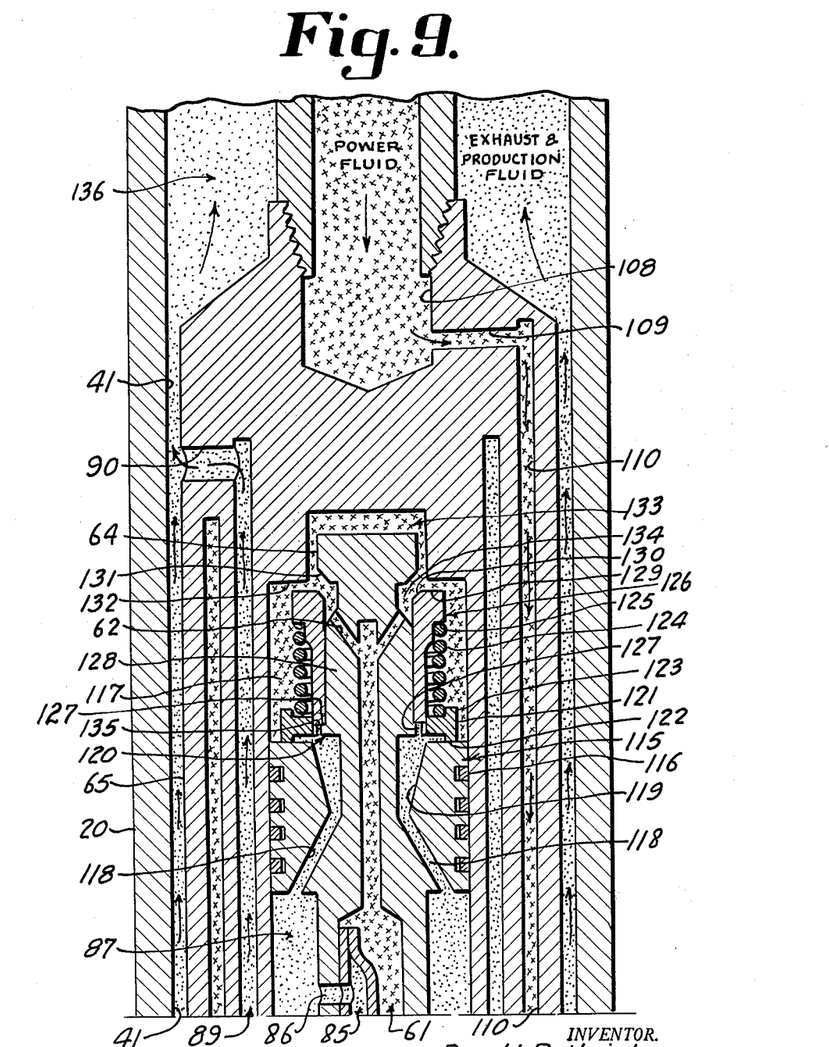
Fig. 9 is a fragmentary view on an enlarged scale of the upper portion of the valve mechanism shown in Figs. 1 and 4-8, inclusive.

Referring to Fig. 9, a ring 121 is mounted circumjacently to the flange 120 and has a downwardly directed lower lip 122 which is axially of sufficient length to span the space between the lower surface of the flange 120 and the top of the piston 115 and to bear against the upper surface of the balancing piston 115 for closing off the bleeder slots 119. The ring 121 has an upper lip 123 which retains a coiled check sleeve spring 124 acting between the ring 121 and a downwardly directed shoulder 125 on a check sleeve 126. The outer diameter of the lower end of the check sleeve 126 is the same as the outer diameter of the flange 120 and has a lower lip 127 which abuts on the flange 120 when the check sleeve 126 is moved downwardly. The interior diameter of the check sleeve 126 closely fits a lower enlarged section 128 of the valve head stem 63. The upper end of the check sleeve 126 is enlarged, forming a lip 129, the lower edge of which forms the spring retaining shoulder 125. The inner upper corner of the lip 129 is beveled to form a seat 130 for a mating beveled corner 131 on the bottom of the valve head 64.

The chamber 117 is abruptly reduced in diameter just above the upper lip of the check sleeve 126 to form a shoulder 132 against which the top surface of the lip 129 would bear if the check sleeve 126 were moved upwardly a sufficient distance. The shoulder 132 defines the edge of a reduced diameter valve head pocket 133 into which the valve head 64 is moved in its uppermost position.

The diameter of the enlarged section 128 of the valve stem 63 is larger than the diameter of the valve stem 63 immediately beneath the valve head 64 and thus an annular space 134 is provided beneath the level of the seat 130 into which space orifices 62 open from the central bore 61 of the valve body 60.

A plurality of axial bleeder openings 135 are drilled through the flange 120 opening into the space beneath the ring 121 in line with the slots 119 so that oil may be bled from the chamber 117. These openings are controlled by the check sleeve 126.

The spring 124 normally tends to maintain the check sleeve 126 in open position, away from bleeder openings 135, but when high pressure power fluid is present in the chamber 117, the spring 124 is compressed permitting the lower lip 127 of the check sleeve 126 to enter the space within the check sleeve 126 and close the openings 135.

The annular production fluid conduit 41 extends upwardly beyond the top of the valve casing 65 and (in the embodiment illustrated in the drawings) communicates with the annulus 136 surrounding the power fluid line threaded into the connection 108 within the well casing 20. The annulus 136 extends to the surface, serving to carry production fluid upwardly, and in the embodiment shown, also carrying used power fluid out of the device.

OPERATION

DOWNSTROKE

Figs. 1, 2, 3 and 7 illustrate the position of the several parts of a device embodying the invention shortly after the commencement of the downstroke of the engine piston 49. This movement is caused by the pressure of the power fluid fed into the valve section of the device (Figs. 1 and 7) from the power fluid line 108 through the radial port 109 down the power fluid conduit 110 and through the radial ports 111 into the interior of the flow chamber 58. From this point the power fluid flows upwardly into the valve chamber 97 and through the radial ports 113 into the interior of the valve body 60 and through the axial bore 61 to the upper end of the engine cylinder 43. This power fluid exerts force on the upper end of the engine cylinder 43 tending to drive the engine piston downwardly and, through the medium of the piston rod 29 to push the pump piston 28 toward the bottom of the pump cylinder 22.

During such downward movement of the piston 49, the lower end of the engine cylinder 43 (Fig. 2) also is connected to the power fluid line 108 through the following connecting means: from the sump 47 at the lower end of the engine cylinder 43 through the radial openings 45 to the annular power fluid conduit 44, around the tapered upper end 66 of the cylinder 43 and to the flow chamber 58. The engine piston 49 is moved downwardly, as explained above, because the effective area of its upper end is greater than the effective area of its lower end by an amount corresponding to the cross sectional area of the piston rod 29.

Figure 7:
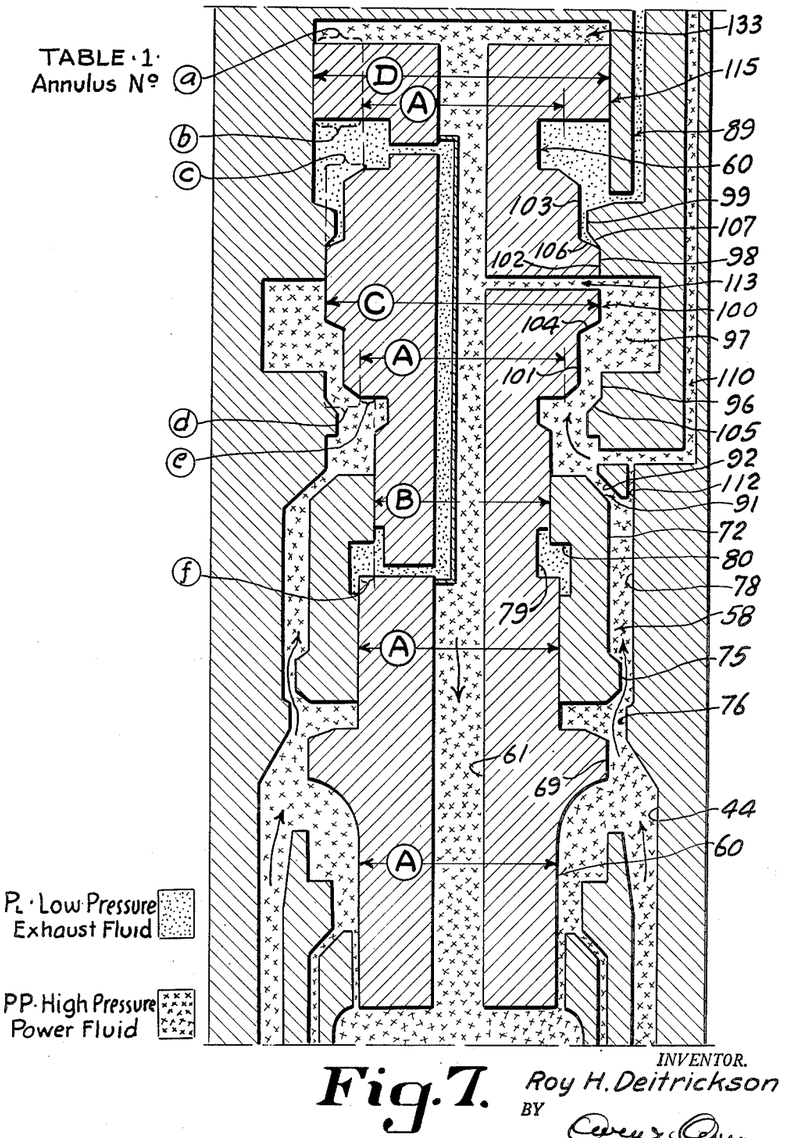
Fig. 7 is a somewhat diagrammatic vertical sectional view corresponding to Fig. 1 but with the diameters of the parts and the differences in diameters exaggerated and their lengths diminished to illustrate balancing pressure differentials existing during the downstroke of the engine and pump pistons as also shown in Fig. 1.

Therefore, even though the power fluid under pressure communicates directly with the portion of the engine cylinder 43 beneath the engine piston 49, the flow of power fluid in the lower end of the engine cylinder 43 and thus in the annular power fluid conduit 44 is upwardly, i. e., the fluid is expelled from the bottom of the cylinder 43 by movement of the engine piston 49 downwardly. The power fluid located beneath the engine piston 49, is forced upwardly through the annular conduit 44 at a pressure higher than that of the power fluid being fed through the radial ports 111, spool valve chamber 97, radial ports 113 and axial bore 61 into the upper end of the engine cylinder 43. These two "phases" of the power fluid meet, as it were, above the rim 75 of the collar 72. The power fluid being forced upwardly from the lower side of the engine cylinder 43 has a greater pressure than the power fluid above the rim 75, so that there is a pressure drop at the upper shoulder of the rim 75. This tends to hold the collar 72 in its upper position, as shown in Figs. 1 and 7, even though its greater top area normally would tend to urge the collar 72 downwardly as is explained above. The collar 72, therefore, "floats" with the annular opening around its rim 75 and between the shoulders of the rim 75 and the land 76 maintained open by the flow of power fluid being expelled from beneath the engine piston 49.

As the engine piston 49 is driven downwardly, the downward movement of the pump piston 28 (Fig. 3) forces the production fluid located in the cylinder 22 beneath the pump piston 28 upwardly through the duct 32 into the interior of the pump cylinder 22 above the pump piston 28. It might be noted at this point that although the pump shown in the drawings (e. g., Fig. 3) is of the type generally referred to as a single acting pump, the presence of the piston rod 29 above the pump piston 28 reduces the volume of the pump cylinder 22 proportionately as the piston 28 is driven downwardly and all of the production fluid drawn into the pump cylinder 22 beneath the pump piston 28 on its previous upstroke cannot be accommodated in the cylinder 22 when the piston 28 is driven downwardly. Therefore, a proportional quantity corresponding to the difference in volume between the pump cylinder 22 with the piston 28 at the top and the cylinder 22 with the piston 28 at the bottom, is pumped out of the pump cylinder 22 during the downstroke of the piston 28. This production fluid passes out of the openings 40 and into the production fluid conduit, i. e., the external annulus between the well tubing 20 and the engine casing 42 to the large annulus 136 at the upper end of the device and thence to the surface.

During the downstroke of the engine piston 49, while the power fluid forced from beneath the engine piston 49 is flowing upwardly past the rim 75 of the collar 72, it would seem that its action would be to drive the collar 72 upwardly rather than maintaining it in the "floating" condition described above. However, if the collar 72 were driven upwardly far enough its upper beveled shoulder 91 would contact the downwardly directed beveled shoulder 92 stopping the flow of the escaping power fluid around and past the collar 72 except for that portion which might flow through the bleeder passageway 112, as hereinafter described. If this occurred, the escape of the power fluid from the engine cylinder 43 beneath the piston 49 would be substantially stopped. This would equalize the pressures on the upper and lower faces of the rim 75 and, because of its greater effective area at the top (by reason of the difference in diameters of the portions of the valve body 60 on which it slides), the collar 72 would then be moved downwardly until the pressures acting around it again were balanced.

During the downward stroke of the engine piston 49, the main valve consisting of the valve body 60 and all of its operatively associated parts, is held upwardly in the position shown in Figs. 1 and 7 by a relative pressure balance which results from the difference in the pressures of the power fluid ($P_P$) and the exhaust and production fluid ($P_L$) acting over unbalanced areas of the balancing piston 115, spool valve 100 and offset shoulders formed by the annular grooves 79 and 80 cut in the collar 72 and valve body 60, respectively.

Referring particularly to Fig. 7 and to Table I appearing below, the balance of pressure areas holding the valve in the upper position during the downstroke of the engine piston is derived as follows. The area of the valve body 60 indicated by the diameter line A is balanced out throughout the length of the body 60 except for the areas of offset created by the annular grooves 79 in the body 60 and 80 in the collar 72. The areas, therefore, which must be considered in determining the balance of pressures acting on the valve body 60 are those indicated in Fig. 7 as annulus $a$ (diameter D–A); annulus $b$ (diameter D–A); annulus $c$ (diameter C–A); annulus $d$ (diameter C–A); annulus $e$ (diameter A–B) and annulus $f$ (diameter A–B).

In the calculations for Table I below, diameter A of the main valve body 60, the diameter from which the respective balancing annuli are calculated, is based upon an actual embodiment of the invention and has a value of 0.750 inch. The other diameters, viz., B, C and D, have respective sizes in relationship thereto such that the annuli indicated by the letters $a$, $b$, $c$, $d$, $e$ and $f$ have the areas shown in Table I below. These particular dimensions and the areas effective at any time are included here merely by way of example and, of course, change appropriately in pump engines having different dimensions.

Table I.—*Pressure balance on valve during downstroke*

(See Figs. 1 and 7)

| Annulus | On Part Number | Fluid Acting | Effective Area in Sq. Inches | Direction | Balance |
|---|---|---|---|---|---|
| $a$ | 115 | High | .2953 | Down – | |
| $b$ | 115 | Low | .2953 | Up + | –.2953 ($P_P$–$P_L$) |
| $c$ | 100 | Low | .2485 | Down – | |
| $d$ | 100 | High | .2485 | Up + | +.2485 ($P_P$–$P_L$) |
| $e$ | 101 | High | .0706 | Up + | |
| $f$ | 79 | Low | .0706 | Down – | +.0706 ($P_P$–$P_L$) |
| | | | | | +.0238 ($P_P$–$P_L$) |

$P_P$ = Power or high pressure fluid.
$P_L$ = Exhaust or low pressure fluid.
($P_P$–$P_L$) = Pressure differential.

Fig. 7 illustrates the position of the valve body 60 and its associated mechanism during the downstroke of the pump and thus corresponds to Fig. 1 of the drawings except for the fact that in Fig. 7 the diameters of the various parts have been exaggerated and the differences in diameter between parts have been even more greatly exaggerated. In Fig. 7 low pressure or exhaust fluid ($P_L$) is shown by dotted areas and high pressure or power fluid ($P_P$) is indicated by x'd areas.

Starting at the upper end of the balancing piston 115 in the valve head pocket 133 it will be seen that high pressure fluid ($P_P$) acts over the entire surface including annulus $a$. At the lower surface of the balancing piston 115 low pressure fluid ($P_L$) acts upon an annulus $b$ having the same area. The balance between the pressure on annulus $a$ and annulus $b$ thus is the area of the annulus $a$ or $b$ multiplied by the value ($P_P - P_L$) or the differential between the high pressure or power fluid and the low pressure or exhaust fluid.

The pressure differential between the two types of fluid acting in a pump embodying the invention is the basis for all of the control of the valve body 60 and of the "floating" control collar 72 which exercises primary control over the valve body 60. It is by properly reacting to changes in the pressure differential between the two fluids and in the exposure of varying annular areas to these two fluids that motion of the valve body 60 and, consequently, valving of the two fluids is accomplished.

Continuing with Table I and Fig. 7, the next area to be considered is indicated as annulus $c$ and is located on the upper surface of the main spool valve 100 in the clearance between the stepped shoulder 99 and beveled seat 107 on the valve casing 65 and the upper extension 103 and upper beveled surface 106 on the spool valve 100. It should be noted that although these adjacent surfaces (shoulder 99 and extension 103 and seat 107 and surface 106) are shown as meeting in Fig. 1 (because of the inability to show proper clearance in that figure), the surfaces do not actually contact each other and the clearance exaggerated therebetween in Fig. 7 actually exists in a structure embodying the invention. It should be noted that the sealing of the spool valve 100 at this point takes place between the step shoulder 98 on the casing 65 and the main cylindrical surface 102 of the spool valve 100, these two surfaces being grounded with small tolerances.

This upper annulus $c$ is subjected to low pressure fluid ($P_L$) and the similar annulus $d$ on the lower surface of the spool valve 100, i. e., at the beveled surface 104, is subjected to high pressure fluid ($P_P$). The pressure differential thus acting on the spool valve 100 and, therefore, on the valve body 60 itself, equals the area of annulus $c$ or annulus $d$ multiplied by the value ($P_P - P_L$). This pressure differential however acts upwardly on the valve body 60 by reason of the fact that the high pressure annulus $d$ is on the underside of the spool valve 100 in contrast to the pressure differential acting on annuli $a$ and $b$ which is downward on the spool valve body. In Table I upward pressure is indicated as + value and downward pressure as — value.

The next areas to be considered are those resulting from the offset in diameter of the valve body 60 created by the annular groove 79 and opposed by the annular groove 80 in the collar 82. The location of annulus $e$ at the lower end of the spool valve 100 or at the lower edge of the extension 101 thereof, exposes the area of annulus $e$ to high pressure fluid ($P_P$). By reason of the connection through the conduit 85, the wall of the annular groove 79 in the valve body 60 is exposed to low pressure fluid ($P_L$) as indicated at annulus $f$. The force acting on the valve body 60 from annuli $e$ and $f$ thus is the product of the area of annulus $e$ or $f$ multiplied by the pressure differential value ($P_P - P_L$) and acts in an upward direction because the high pressure fluid ($P_P$) acts on annulus $e$ to push the valve body 60 upwardly.

As appears in the right-hand column of Table I, above, the balance of the pressure differential acting on the six annuli above-identified results in there being a force totaling the pressure differential ($P_P - P_L$) times an area of .0238 square inch. This is sufficient force to hold the valve body 60 upwardly with high pressure fluid from the power fluid conduit 110 flowing in the path above indicated through the radial ports 113 to the central port 61 and then to the upper end of the engine piston 49.

The valve body 60 remains in the position shown in Figs. 1 and 7 providing for the flow of high pressure or working fluid to the space above the engine piston 49 and thus the downward movement of the engine piston 49 and the pump piston 29, until the engine piston 49 reaches the bottom of its stroke, or until the pressure differential holding the control collar 72 in its upper position is otherwise removed, as by a "racing stroke," as will later be described.

As the engine piston 49 approaches the bottom of its stroke its enlarged section 51 enters the sump 47 (Fig. 2). This partially traps a small quantity of power fluid in an annular space indicated by the reference number 137 in Fig. 2. This small quantity of fluid is allowed to escape from the bottom of the engine cylinder 43 through the openings 45 only by passing around the enlarged section 51 which has a small clearance with the interior of the axial walls of the sump 47. This small clearance prevents the engine piston 49 from striking the bottom of the engine cylinder 43 sharply, the restricted escape orifice for the oil trapped in the space 137 slowing down the movement of the piston 49 and providing for the reversal of the operation before the main body of the piston 49 reaches the bottom of the cylinder 43.

BOTTOM REVERSAL

Figure 4:
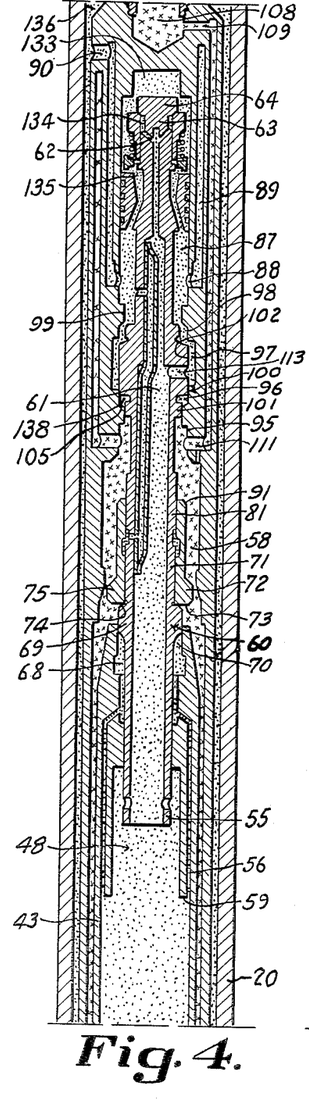
Fig. 4 is a view similar to Fig. 1 but showing the location of the valving mechanism at the bottom reversal of the engine piston and pump plunger.

When the engine piston 49 approaches the bottom of its stroke the reduction of rate of flow of power fluid out of the engine cylinder 43 from the space beneath the piston 49 also reduces the flow of oil upwardly past the rim 75 of the collar 72 and the unit pressures acting on the collar 72 approach balance. When the flow of oil past the collar 72 is sufficiently reduced so that the force acting upwardly on the collar 72 becomes less than the biasing force resulting from the area differential between the ends of the collar 72, the collar 72 is moved downwardly. The "biasing force" is the force resulting from the fact that the diameter of the cylindrical section 81 of the valve body 60 is less than the diameter of the cylindrical section 71 of the valve body 60 and, therefore, the sum of the effective pressure receiving areas of the upper end 83 of the collar 72, the beveled shoulder 91 and the upper beveled shoulder of the rim 75, is greater than the sum of the pressure receiving areas of the shoulder 73 and the lower beveled shoulder of the rim 75.

The collar 72 is moved downwardly engaging its shoulder 73 against the opposed shoulder 74 on the cylindrical portion 69 of the valve body 60. This drives the entire valve body 60 and its associated parts downwardly. As the valve body 60 moves downwardly the valving seal between the inner surface of the shoulder 98 and the cylindrical surface 102 of the spool valve 100 is broken; the cylindrical portion 69 enters into valving engagement with the wall of the chamber 68; and the lower extension 101 of the spool valve 100 enters the space defined by the annular interior of the lower shoulder 95. As soon as the valving surfaces 98 and 102 are broken low pressure fluid is admitted into the spool valve chamber 97 around the upper end of the main spool valve 100. Continued downward movement of the valve body 60 then inserts the lower end of the main cylindrical surface 102 into the upper shoulder 95 at the lower side of the spool valve chamber 97. The movement of the spool valve 100 downwardly to this position shuts off the flow of power fluid from the radial ports 111 to the radial port 113 into the interior bore 61 of the valve body 60.

A small quantity of fluid is, however, almost trapped in an annular space indicated by the reference number 138 in Fig. 4 between the beveled surface 104 and its beveled seat 105. Because the outer surface of the extension 101 on the spool valve 100 is of lesser diameter than the inner surface of the shoulder 95, a thin annular orifice is left therebetween through which the fluid trapped in the space 138 can slowly escape much in the same manner as the fluid trapped in the space 137 beneath the engine piston 49 slowly escapes to prevent sharp engagement of the parts. The valve body 60 (and its associated mechanism) is thus slowly brought to a halt in its downward movement.

This same downward movement of the valve body 60 also inserts the cylindrical portion 69 of the valve body 60 into the enlarged chamber 68 above the lower pocket 57. This cuts off the axial slots 70 from the flow chamber 58.

Simultaneously with the just described operation, the downward movement of the spool valve 100 opens an annular passageway around its upper end, i. e., the stepped shoulders 98 and 99, connecting the exhaust chamber 87 with the spool valve chamber 97 and through the radial ports 113 to the interior bore 61 of the valve body 60. This connects the engine cylinder 43 above the piston 49 to the exhaust chamber 87 and through the radial openings 88 to the exhaust duct 89 and the radial port 90 to the production fluid annulus 136. This connection results in dropping the pressure of the fluid above the engine piston 49 to the lower pressure existing in the production and exhaust fluid annulus 136.

Because the power fluid remains connected to the space 137 beneath the engine piston 49, i. e., because the collar 72 does not act as a valve with respect to its cooperating land 76, high pressure power fluid beneath the engine piston 49 now is exerted against the lower pressure fluid above the engine piston 49 that is connected only to the low pressure production and exhaust fluid annulus 136. Therefore, the engine piston 49 is moved upwardly.

As the engine piston 49 starts to move upward under the pressure of the power fluid being forced into the space 137 beneath it, the pump piston 28 also begins to move upwardly which causes the travelling ball valve 37 to be seated and the standing ball valve 38 to be opened. This draws production fluid into the pump cylinder 22 beneath the pump piston 28 as it moves upwardly and exhausts or discharges the production fluid in the pump cylinder 22 above the pump piston 28 into the production fluid conduit 41 and eventually into the production fluid annulus 136 and to the surface.

UPSTROKE

Figure 5:
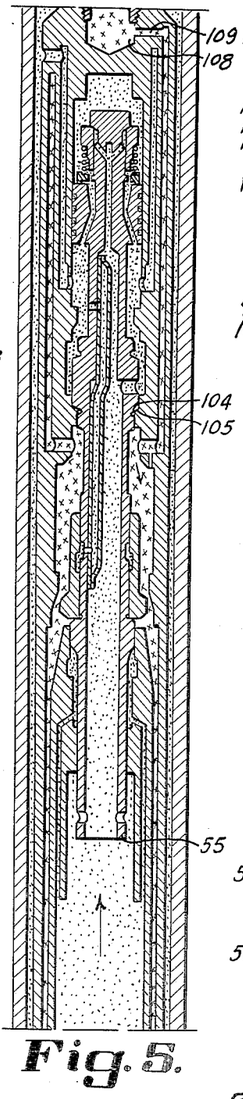
Fig. 5 is a view similar to Figs. 1 and 4 but illustrating the positions of the valving mechanism during an upstroke of the engine piston and the pump plunger.
Figure 8:
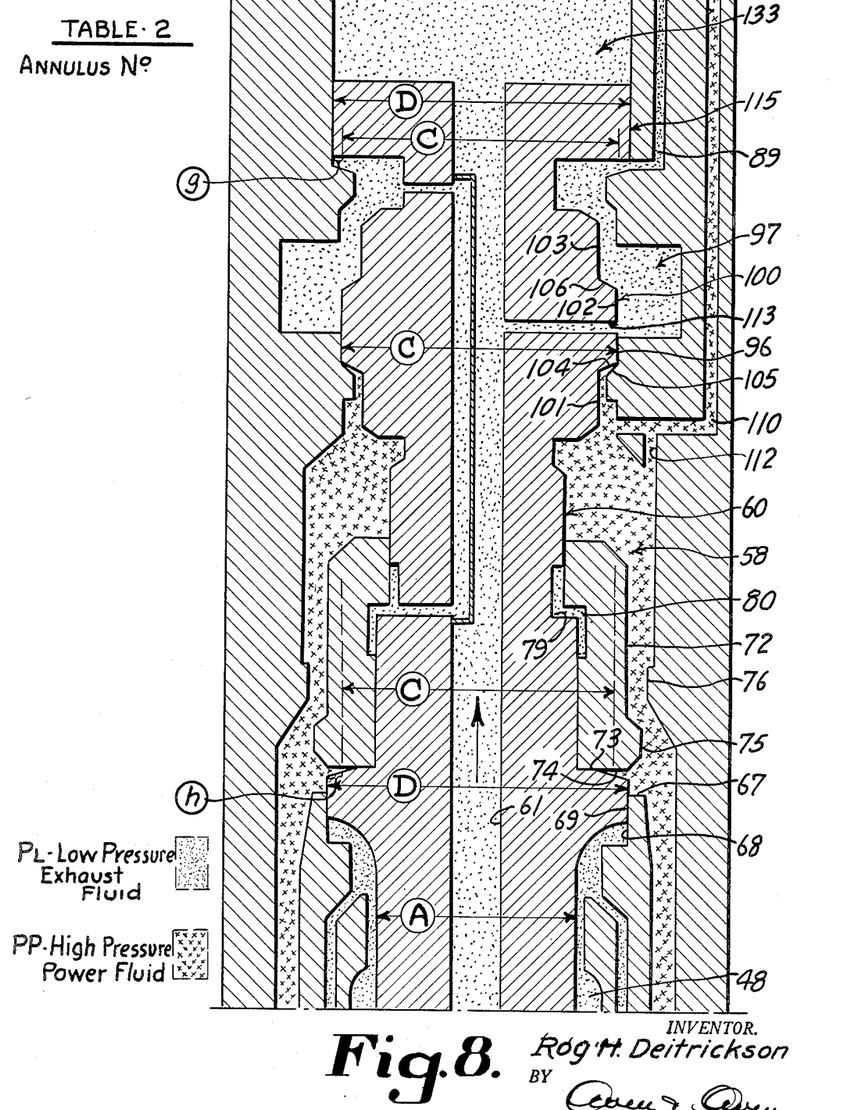
Fig. 8 is a view similar to Fig. 7 but showing the position of the valving mechanism at that point in the cycle of operations shown in Fig. 5, i. e., during the upstroke of the pump.

As soon as the lower edge of the main spool valve surface 102 has entered the sealing surface of the upper shoulder 96, the balance of hydraulic forces acting on the valve body 60 is such that the valve is moved downwardly until the corner of its beveled surface 104 seats fully at the corner of the beveled seat 105. The forces both acting to thrust the valve body 60 downwardly to this position and to hold it seated during the upstroke of the engine piston are balanced out as set forth below and result in the net pressure acting on the valve body as set forth in Table II.

Table II.—*Pressure acting on valve during upstroke*

(See Figs. 5 and 8)

| Annulus | On Part Number | Fluid Acting | Effective Area in Sq. Inches | Direction | Balance |
|---|---|---|---|---|---|
| g | 115 | Low | .0468 | Up + | |
| h | 69 | High | .0468 | Down − | −.0468 (P$_P$−P$_L$) |

Referring particularly to Figs. 5 and 8, it will be seen that all of the cross sectional areas of the valve body 60 and its associated parts are balanced out except for the two annuli indicated as g and h in Fig. 8. These other areas balance as follows: The top area of the balancing piston 115 having a diameter D is balanced by the lower end of the valve body 60 at its greatest diameter D at the cylindrical portion 69. Both of these areas are exposed to low pressure exhaust fluid.

The lower surface of the balancing piston 115 out to the diameter of the main cylindrical surface 102 of the spool valve 100 (i. e., the diameter C) is balanced against the upper surface of the spool valve 100. Both of these areas are exposed to low pressure fluid, thus leaving the annulus g (diameter D minus diameter C) unbalanced and subject to low pressure fluid acting upwardly. The area of this annulus g is .0468 square inch on a pump having the dimensions set forth above with respect to Table I. The annulus g is the first unbalanced area which must be considered and thus appears on line 1 of Table II above.

Similarly, the lower surface of the spool valve 100 to the maximum diameter of its main cylindrical surface 102 is balanced against an area extending to an equal diameter C on the upper surface of the collar 72. These two surfaces are exposed to high pressure fluid in the upper part of the flow chamber 58. Because the collar 72 is fully seated with its shoulder 73 against a mated shoulder 74 on the spool valve body 60, the collar 72 in the position illustrated in Figs. 5 and 8 is, in effect, a fixed part of the valve body 60.

The area of the collar 72 in excess of diameter C is balanced both above and below by high pressure fluid in the flow chamber 58.

At the meeting corner of the shoulder 74 on the cylindrical portion 69 of the valve body 60 and the outer surface of the cylindrical portion 69 itself, i. e., just beneath the rim 75 of the collar 72, an annulus h having an area determined by the diameter D minus the diameter C, is exposed to high pressure fluid in the chamber 58. This fluid acts downwardly. The annulus h is the second unbalanced area on the valve body 60 in the position shown in Figs. 5 and 8, i. e., during the upstroke of the engine piston, is equal to the area of the annulus g or h multiplied by the pressure differential ($P_P$−$P_L$). This This force acts downwardly as shown in Table II above.

This condition continues during the upstroke of the engine piston and holds the valve in the position indicated in Figs. 5 and 8, with the power fluid flowing downwardly through the flow chamber 58 to the lower end of the engine piston 49 and the exhaust fluid being displaced upwardly through the axial bore 61 in the valve body 60 to the spool valve chamber 97 and out through the exhaust duct 89.

Figure 6:
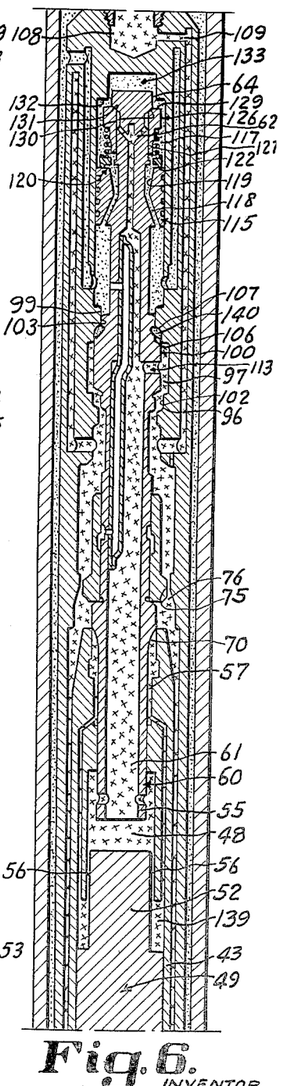
Fig. 6 is a view similar to Figs. 1, 4 and 5 but illustrating the position of the valving mechanism at the top reversal of the engine piston and pump plunger.

This movement continues until the engine piston approaches the upper limit of its stroke at which time the cylindrical extension 52 on the engine piston 49 enters the pocket 48 at the upper end of the engine cylinder 43 reaching the position shown in Fig. 6.

TOP REVERSAL

As the cylindrical extension 52 enters the upper pocket 48 of the engine cylinder 43, the pressure on the fluid now trapped in an annular space indicated by the reference number 139 in Fig. 6 increases. The fluid trapped in the space 139 can escape therefrom only through the relatively small clearance around the exterior of the extension 52 of the piston 49 or through the axial passageways 56 which lead upwardly to the lower pocket 57. This increase in pressure on the lower end of the valve stem 55 and on the walls of the axial slots 70 and in the interior of the axial bore 61 of the valve body 60 raises the valve body 60 and its associated parts before the end of the extension 52 of the piston 49 contacts the lower end of the valve stem 55.

The spacing of the parts is such that the rim 75 of the collar 72 laps the land 76 before the spool valve 100 is moved out of its cylindrical seat, i. e., before the main cylindrical surface 102 is unsealed from the shoulder 96.

As soon as the rim 75 of the collar 72 laps its land 76, the volume of the flow of power fluid past the rim 75 and into the flow chamber 58 and thence to the lower end of the pump cylinder 43, is substantially reduced and the upwardly movement of the piston 49 is slowed.

As soon as the spool valve 100 is moved upwardly a distance sufficient to unseal its main cylindrical surface 102 from the upper shoulder 96, high pressure fluid immediately flows through the spool valve chamber 97 and radial port 113 into the interior bore 61 of the valve body 60 and into the upper end of the engine cylinder 43. This reverses the movement of the engine piston 49 starting it down.

As high pressure power fluid enters the axial bore 61 it also flows upwardly through that bore to the angularly drilled orifices 62 where it is trapped in the space 134 by the valve head 64. As the valve body 60 continues to move upwardly by reason of the high pressure on the lower faces of the several sections, the lip 129 on the check sleeve 126 strikes the shoulder 132 at the edge of the valve head pocket 133 and the upward movement of the check sleeve 126 is stopped. As the valve body 60 and the valve head 64 continue to move upwardly the seal between the seat 130 and the beveled corner 131 is broken. This allows high pressure power fluid to flow into the valve head pocket 133 and to act on the upper surfaces of the check sleeve 126 moving it down. The lower lip 122 of the ring 121 caps off the upper open ends of the connecting slots 119 which, through the bleeder holes 118, communicate with the exhaust chamber 87 beneath the balancing piston 115. Further downward movement of the check sleeve 126 moves its lower lip 127 into the space just above the disk-like flange 120 sealing off the bleeder openings 135.

Although the bleeder openings 135 were open at the time of the commencement of the top reversal (as shown in Fig. 6), and remain open during the initial entry of high pressure fluid from the orifices 62 into the chamber 117, the initial downward movement of the check sleeve 126 brings its lower edge 127 closely adjacent the ring 121 above the bleeder openings 135. Therefore, fluid tending to flow out through the bleeder openings 135 must pass the restricted annular space thus formed. There is thus a lower pressure on the underside of the check sleeve lip 127 than is exerted on the top of the check sleeve so that the sleeve will continue to move down into full seating engagement against the disk-like flange 120 closing off the bleeder openings 135 and trapping high pressure fluid above the balancing piston 115.

The upward movement of the valve body 60 and its operatively associated parts, although initiated before the engine piston 49 reaches the upper limit of its travel, is not completed until after the engine piston 49 has already travelled a substantial distance downwardly and it may, in fact, not be completed until the engine piston 49 approaches the bottom of its stroke.

Low pressure fluid is trapped during the previously described upward movement of the valve body 60 and spool valve 100 in a space designated by the number 140 in Fig. 6 between the upper beveled surface 106 of the spool valve 100 and its beveled seat 107. The fluid in the space 140 acts as a cushion for the valve body 60 and prevents any pounding at the end of the upward movement because such fluid must escape around the relatively small opening between the cylindrical upper extension 103 of the spool valve 100 and the shoulder 99 with which it cooperates.

As soon as the check sleeve chamber 117 and the valve head pocket 133 are filled with high pressure fluid, the mechanism finally comes to rest in the position illustrated in Fig. 1. Again the flow of high pressure fluid out of the engine cylinder 43 from the space beneath the downwardly moving engine piston 49 past the rim 75 of the collar 72 causes that collar to "float" in the flow chamber 58 in the position shown in Fig. 1. In this position of the collar 72 which continues during the downstroke of the device, there is formed a relatively constant orifice around the periphery of the lip 75 with the wall of the flow chamber 58 in series with a variable orifice formed by the upper shoulder 91 of the collar 72 and its opposing stationary shoulder 92.

The presence of the high pressure oil above the valve head 64 reduces the otherwise overwhelming upward thrust of the power fluid acting through the axial bore 61 of the valve body 60 and balances the valve system so as to permit the movement of the valve to the position shown in Fig. 4 at the bottom reversal of the device by the force available from the control collar 72.

EFFECT OF GAS IN PUMP CYLINDER

Because of the presence of gas pockets in connection with oil pools, gas itself frequently is drawn into the pump cylinder of a downwell pump. When this occurs in a downwell pump embodying the invention on the upstroke of the pump, the gas enters the pump cylinder 22 beneath the pump piston 28 and may, in fact, entirely fill the cylinder 22 beneath the piston.

Upon the next reversal of the pump, i. e., upon the commencement of a subsequent downstroke of the engine piston 49 and pump piston 28, the gas drawn into the pump cylinder 22 offers but little resistance to the downward movement of the piston 28 due to its compressibility. Since there is no liquid in the pump cylinder, the traveling valve 37 remains seated and the static head from the production column acts through passage 34, passages 33 and the center passage 32 on the pump piston in a downward direction. This added energy causes the engine piston 49 to start to move downwardly at a high rate of speed. This exerts excessive pressure on the fluid in the engine cylinder 43 beneath the engine piston 49 and forces it upwardly through the annular conduit 44 under higher pressure than would normally be present.

The fluid thus is forced upwardly through the flow chamber 58 under pressure higher than it has when it reaches that position during a normal stroke with the engine piston 49 moving downwardly under load. The increased pressure in the fluid in the flow chamber 58 further increases the forces acting upwardly against the control collar 72. Because the pressure in the oil in the chamber 58 beneath the control collar 72 is proportionately higher than the pressure in the chamber 58 above the control collar 72, the pressure drop around the rim 75 of the control collar being thus greater, the collar 72 is moved upwardly.

When the control collar 72 is moved upwardly its beveled shoulder 91 approaches the beveled shoulder 92 on the lip 93, restricting the annular passageway normally existing therebetween (most clearly seen in Fig. 7). The reduction in area of the passageway between the cooperating shoulders 92 and 93 restricts the flow of fluid out of the flow chamber 58 and thus out of the lower end of the engine cylinder and thus limits the rate at which the engine piston can move down. When the engine piston has slowed down, the pressure above the flow collar 72 may again approach the normal operating differential with respect to the pressure acting beneath the collar 72. When this condition is achieved, the collar 72 moves downwardly by reason of the greater effective area on its upper end due to the offset in the diameter of the valve body 60 on which it slides (Fig. 7, diameter A minus diameter B).

The return of normal pressure balance in the pressures in the flow chamber 58 results in returning the collar 72 toward its normal lower position as illustrated in Fig. 7. In effect, therefore, when gas is present beneath the pump piston 28 and the pump enters what would otherwise be an excessively high speed stroke, the effect of the presence of the gas is to increase the pressure on th fluid beneath the engine piston 49, to raise the "floating" control collar 72 above its normal position in the flow chamber 58, and to cause it to exercise a throttling or governing effect on the rate of movement of the engine piston 49, maintaining the speed of the piston 49 at substantially its normal rate.

In the event that the engine piston 49 should start downwardly with such a high rate of speed that the pressure in the fluid beneath the piston 49 increases to such an extent that the floating control collar 72 is thrust upwardly until its beveled shoulder 91 comes into contact with the cooperating beveled shoulder 92, the flow of expelled fluid from beneath the engine cylinder 49 would be stopped completely and the engine piston 49, and thus the pump, would "lock" up, were it not for the presence of the axial bleeder passageway 112 (Fig. 7) which communicates between the flow chamber 58 and the power fluid conduit 110. The bleeder passageway 112 allows enough fluid to pass from the high pressure area in the flow chamber 58 to the lower pressure in the power fluid conduit 110 to release the control collar 72 from its upper position and carry it into its balanced "floating" position explained above.

The likelihood of the existence of conditions conducive to a high speed up-stroke is very much less than the likelihood of the conditions described above which would give rise to a high speed down-stroke. This is due to the fact that there is always present in the production column the liquid exhausted from the engine cylinder which would act as a static head even when no liquid was being pumped from the formation. However, in the event that gas does become trapped above the pump piston 28, the resistance to the movement of the pump piston 28 upwardly is lowered only by the compressibility of the gas and by the reduction in the total weight of the static head of production and exhaust fluid resulting from the gas therein. Under these conditions the engine piston 49 has a tendency to make up an upward stroke at an increased rate of speed. This rapidity of movement increases the pressure of the fluid above the engine piston 49 very rapidly and to a higher level than normally would exist. Because the fluid above the engine piston 49 must discharge upwardly through the bore 61 in the valve body 60 (Fig. 8) and is partially trapped in the pocket 48 and the enlarged chamber 68 beneath the cylindrical portion 69 of the valve body 60, increase in pressure therein raises the valve body 60 slightly. This reaction results from the fact that the pressure differential in the fluid in the top of the engine cylinder and in the partially gas filled production column is increased by the flow through the bore 61, and the radial ports 113. The several passages therefore become restricting orifices for the fluid thus being rapidly expelled.

Because the balance of forces acting to hold the valve body 60 downwardly in the position shown in Fig. 8 (see Table II above) is only slight, the increase in pressure, particularly where it acts through the radial ports 113, overcomes the balance and the valve body 60 moves upwardly.

As soon as the valve body 60 starts to move upwardly the collar 72 is moved upwardly with it and the rim 75 of the collar 72 approaches the land 76. This narrows the annular opening between the rim 75 and land 76 and restricts the flow of power fluid downwardly through the annular conduit 44 to the interior of the engine cylinder 43 beneath the engine piston 49. Restriction of the flow of fluid to the space beneath the engine piston 49 slows its rate of upward movement. When the collar 72 moves into association with land 76, a pressure drop across the nose of the collar will be established tending to urge the collar and valve downwardly and tends to prevent a complete reversal of the valve.

At the same time, and providing that the valve body 60 has been thrust upwardly a sufficient distance, the upper extension 103 on the spool valve 100 extends into the area delineated by the step shoulder 99 (Fig. 8) and reduces the flow of exhaust fluid between chambers 97 and 87 even further. This increases the pressure in the exhaust fluid side of the line commensurate with the reduction in pressure on the power fluid side of the system. This action, and the action of collar 72, continues to tend to restore the normal pressure balance.

As a result of the metering or throttling action of the upward movement of the valve body 60 carrying the rim 75 into closer proximity with the land 76, during the movement of the engine piston 49 upwardly with gas in the production column the valve body 60 is lifted from its seat (i. e., the position shown in Fig. 8) and "floats" at a higher level where it, acting in response to the balancing of forces exerted by the control collar 72, throttles the rate of movement of the engine piston 49 preventing it from "racing" when gas is present during the upstroke and thus controlling its speed within relatively narrow limits.

SPEED GOVERNING

The rate of piston travel of a pump embodying the invention is primarily determined by the quantity of the actuating power fluid supplied thereto and is goverened at the determined speed by the "floating" collar 72 under normal stroking conditions.

As is explained above in the section entitled "Downstroke" (Fig. 7) fluid forced from beneath the engine piston 49 during a downstroke flows up the annular conduit 44 into the flow chamber 58, passing the rim 75 of the collar 72. The perimeter of the rim 75 is spaced inwardly from the cylindrical surface 78 of the chamber 58, forming a constant annular orifice through which the expelled fluid must flow on route to the variable orifice at the upper end of the collar 72 and the intersection with the stream of power fluid flowing out of the radial ports 111.

The constant orifice formed between the rim 75 and the wall 78 of the flow chamber controls the normal speed of operation and such speed is only modified in exceptional instances by the action of the variable orifice to reduce the rate of flow through the flow chamber 58. When a build up in pressure beneath the rim 75 of the collar 72 which might otherwise increase the velocity of the fluid flowing past the rim 75 and allow the speed of movement of the engine piston 49 to increase takes place, the action of the collar 72 explained above in decreasing the variable orifice prevents the increase in velocity and consequent increase in speed of operation.

Speed governing and control during the upstroke of the engine piston 49 in normal operation also is established by the volume of the power fluid. Even under slightly abnormal conditions, i. e., where a quantity of gas has entered the pump, the relative constancy of the static head of the production fluid in the production fluid annulus 136 will serve to maintain a substantially constant upstroke velocity. The weight of the column of production fluid extending to the surface is so great with respect to the small variation in the amount of gas usually encountered that no appreciable change in its load against the pump occurs. Under some conditions, however, the volume of gas encountered in the pump operation may be so large as to fill a substantial length of the production fluid column, in which case the static head against which the pump is working is reduced and the "floating" collar 72 must be relied on to govern the maximum speed of operation as explained above.

Normal speed control during the upstroke is a function of the pressure and volume of the working fluid and the annular space existing between the uppermost edge of the rim 75 of the collar 72 and the land 76 (Fig. 8). As explained above with respect to operation in the presence of gas, if the engine piston 49 for some reason is urged upwardly at a rate of travel higher than that desired, the valve body 60 and thus the "floating" collar 72 move upwardly to throttle off the flow of power fluid from the flow chamber 58 downwardly past the land 76 and rim 75.

Thus speed governing is effective and rate of operation substantially constant whether the pump is handling oil alone, or mixtures of oil and gas such as frequently are encountered in a well. The positioning of the "floating" collar 72 in a path through which fluid must either flow or be expelled during the operation of a pump embodying the invention results in there being always present an element immediately responsive to changes in the pressure of the fluid passing thereby which might be caused by changes in viscosity of either the power oil or the production fluid, or the presence of lighter fluid such as gas, or other changes in the viscosity or pressures of the fluids being handled. The balancing effect of the "floating" collar 72 is such that these changes have little effect on the overall speed in number of strokes per minute of a pump embodying the invention.

In general, therefore, control of the speed of operation of a downwell pump embodying the invention is readily adjusted by altering the pressure and volume of the power fluid supplied since the orifices through which the pressure fluid and production fluid must pass are constants. It is possible to achieve a substantial range in number of strokes per minute in any particular pump having a certain collar, rim and flow chamber spacing by merely varying the pressure and volume of the power fluid.

SUMMARY

As explained above, by reason of the fact that all of the valving operations of a pump embodying the invention are caused by changes in pressure and by relative pressures acting on the floating control collar 72 and the elements of the valve body 60, and because there is, therefore, no mechanical connection necessary between the engine piston 49 or its cylinder 43 there is no need for a positive mechanical or structural connection between the assemblies. Although in the modification of the invention illustrated in the drawings, the valve casing 65 is shown as being structurally integral with the engine casing 42 such integrity or even its proximity is not necessary. The structures may be separated from each other at the level of the axial bore 54 and the only connections between the valve casing 65 and engine casing 52 necessary would be pipes or conduits corresponding to the production fluid conduit 41, annular conduit 44, passageways 56 and pocket 48.

Similarly, because the engine piston 49 makes no mechanical connection with the valving mechanism a standard valving mechanism can be employed with engine pistons 49 and pump pistons 28 having any desirable length of stroke.

Having described my invention and a particular embodiment thereof herein in which a modified single action pump portion is employed for the purpose of actually moving the production fluid from the well to the surface, it is to be understood that the invention herein disclosed is not limited to the particular pump structure or the particular details of the valving or other structure but is encompassed within the following claims.

What I claim is:

1. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising valve means to direct the flow and release of operating fluid to said engine cylinder, said valve means including a differential area flow rate control and valve shifting collar subject to the pressure of operating fluid on its larger area and to the pressure of fluid exerted against the smaller area of said engine piston on its smaller area.

2. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising a single valve movable in one direction to cause flow of operating fluid to the larger area of said engine piston, and means movable relative to said valve and responsive to the pressure in said engine cylinder to move said single valve in the opposite direction to cause flow of operating fluid to the smaller area of said engine piston.

3. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereon in one direction, and a source of operating fluid under pressure, the improvement comprising a valve movable in one direction to cause flow of operating fluid to the larger area of said engine piston, a differential area valve shifting collar associated with said valve and operable when the pressures on its faces are balanced to move said valve in the other direction to cause release of operating fluid from the large area of said engine piston.

4. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereon in one direction, and a source of operating fluid under pressure, the improvement comprising a valve movable in one direction to cause flow of operating fluid to the larger area of said engine piston, a differential area valve shifting collar associated with said valve and operable when the pressures on its faces are balanced to move said valve in the other direction to cause release of operating fluid from the large area of said engine piston, and means on said collar to control the rate of flow of fluid to and from at least one end of said engine piston.

5. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising a main tubular valve movable in one direction by pressure of fluid escaping from said engine cylinder to cause flow of operating fluid to the larger area of said engine piston, a differential area flow rate control and valve shifting collar carried by said main tubular valve and reciprocable relative thereto, means on said main valve to limit the movement of said collar in one direction, said collar having differential area faces whereby, when the pressure on its faces are balanced said collar is biased in a direction tending to engage said means and to shift said main valve in a direction opposite to that in which said main valve is moved by said engine cylinder pressure.

6. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising a main tubular valve shiftable by hydraulic pressure from said engine cylinder to one position to cause flow of operating fluid to the larger area of said engine piston, a differential area flow rate control and valve shifting collar carried by said tubular main valve and reciprocable relative thereto, an enlargement on said main valve to limit the movement of said collar in one direction, said collar having differential area faces whereby, when the pressure on its faces are balanced said collar is biased in a direction tending to shift said main valve to a position opposite to that to which said main valve is moved by the engine cylinder pressure, a flow chamber through which fluid passes from the smaller area of said engine piston, the pressure of said fluid being exerted against the smaller area of said collar and tending to move said collar away from said enlargement, and a variable orifice formed by said collar and portions of the walls of said flow chamber in the path of movement of said collar and adapted to restrict said chamber and thereby reduce the fluid flow therethrough, whenever the pressure against the smaller area of said collar exceeds the pressure on the larger area thereof by a predetermined amount.

7. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising a main tubular valve adapted, in a first position, to open communication between said source of fluid pressure and the engine cylinder portion above the larger area of said engine piston, and in a second position to open communication between said engine cylinder portion and a discharge passage at relatively low pressure, and means subject to supply pressure on one face and to the pressure on the smaller area of said engine piston on another face to move said valve to said second position, said last means having differential areas the larger of which is exposed to said supply pressure.

8. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising a main tubular valve movable in one direction by pressure of fluid escaping from said engine cylinder to cause flow of operating fluid to the larger area of said engine piston, said valve including a stem extending therefrom, a shoulder on said stem intermediate its ends, a rate control and valve shifting collar having an upper portion closely fitting said stem above said shoulder and a lower portion closely fitting said stem below said shoulder, said collar having an internal relieved zone on each side of said shoulder whereby said collar is reciprocable on said stem, means to maintain said relieved zone at a pressure lower than the pressure of said operating fluid, and means on said main valve to limit the movement of said collar in one direction.

9. A flow directing and control means for a hydraulic engine having an engine cylinder, and an engine piston in said cylinder, said engine piston having a greater effective area on one side than on the other whereby equal operating pressures on its two faces cause movement thereof in one direction, comprising a valve housing having spaced valve forming parts, a pressure fluid conduit and an escape conduit leading to said housing, a duct leading to one end of said engine cylinder, a reciprocable valve body having parts cooperating with said valve forming parts for alternatively connecting said pressure and escape conduits to said duct, a passageway from said pressure fluid conduit that is constantly in communication with the other end of said engine cylinder and includes a flow chamber surrounding a portion of said valve body, a control collar reciprocable on said valve body within said flow chamber, said control collar having a greater effective area on one end than on the other whereby uniform pressure in said flow chamber biases said control collar in one direction, and means on said valve body against which said collar exerts its bias for urging said valve body into a position for connecting said escape conduit to said duct.

10. The combination of means defined in claim 9, and means on said control collar disposed in said passageway to govern the rate of flow of fluid through said flow chamber.

11. The combination of means defined in claim 9 in which said control collar is disposed in an upper normal position when said valve body connects said pressure fluid conduit and said flow chamber, and in a lower normal position when said valve body connects said pressure fluid conduit and said duct, a land on said flow chamber wall intermediate its ends, and a cooperating surface on said control collar, said land being so disposed as to cooperate with said surface when said control collar is moved opposite thereto to restrict the flow of operating fluid to the lower end of said engine cylinder.

12. The combination of means defined in claim 9 and a balancing member connected to said valve body, said balancing member being subject to the pressure of said escape conduit on one side and alternately to the pressure of said escape and pressure conduits on its opposite side whereby to assist in establishing biasing hydraulic forces on said valve body to maintain said valve body in its reciprocated position.

13. A flow directing and control means for a hydraulic engine having an engine cylinder, and an engine piston in said cylinder, said engine piston having a greater effective area on one side than on the other whereby equal operating pressures on its two faces cause movement thereof in one direction, a valve housing having spaced valve forming parts, a pressure fluid conduit and an escape conduit leading to said housing, a duct leading to one end of said engine cylinder, a reciprocable valve body having parts cooperating with said valve forming parts for alternatively connecting said pressure and escape conduits to said duct, a passageway between said pressure fluid conduit and the other end of said engine cylinder and including a flow chamber surrounding a portion of said valve body, a control collar reciprocable on said valve body within said flow chamber, cooperating surfaces including a surface on said collar forming a variable orifice for varying the flow through said flow chamber inversely to the pressure of fluid against the smaller area of said engine piston, said collar having a greater effective area on one end than on the other whereby uniform pressure in said flow chamber biases said control collar for movement in a direction to open said variable orifice, and high pressure on the smaller effective area of said control collar overcomes the bias and moves said control collar in a direction to reduce said variable orifice, and means on said valve body against which said collar exerts its bias for urging said valve body into position for connecting said escape conduit to said duct.

14. A flow directing and control means for a hydraulic engine having an engine cylinder, and an engine piston in said cylinder, said engine piston having a greater effective area on one side than on the other whereby equal operating pressures on its two faces cause movement thereof in one direction, a valve housing having spaced valve forming parts, a pressure fluid conduit and an escape conduit leading to said housing, a duct leading to one end of said engine cylinder, a reciprocable valve body having parts cooperating with said valve forming parts for alternatively connecting said pressure and escape conduits to said duct, a passageway between said pressure fluid conduit and the other end of said engine cylinder and including a flow chamber surrounding a portion of said valve body, a control collar reciprocable on said valve body within said flow chamber, cooperating surfaces, including a surface on said collar forming a constant orifice connecting said flow chamber with the other end of said engine cylinder and establishing a normal rate of flow of fluid through said flow chamber, other cooperating surfaces, including a surface on said collar forming a variable orifice in said flow chamber and establishing a maximum rate of flow through said flow chamber, said collar having a greater effective area on one end than on the other whereby uniform pressure in said flow chamber biases said control collar for movement in a direction tending to open said variable orifice, and high pressure on the smaller effective area of said control collar overcomes the bias and moves said control collar in a direction to reduce said variable orifice and means on said valve body against which said collar exerts its bias for urging said valve body into position for connecting said escape conduit to said duct.

15. A flow directing and control means for a hydraulic engine having an engine cylinder, and an engine piston in said cylinder, said engine piston having a greater effective area on one side than on the other whereby equal operating pressures on its two faces cause movement thereof in one direction, a valve housing having spaced valve forming parts, a pressure fluid conduit and an escape conduit leading to said housing, a duct leading to one end of said engine cylinder, a reciprocable valve body having parts cooperating with said valve forming parts for alternatively connecting said pressure and escape conduits to said duct, a passageway between said pressure fluid conduit and the other end of said engine cylinder and including a flow chamber surrounding a portion of said valve body, a flow control collar reciprocable on said valve body within said flow chamber, cooperating surfaces, including a surface on said collar forming a constant orifice connecting said flow chamber with the other end of said engine cylinder and establishing a normal rate of flow of fluid through said flow chamber, other cooperating surfaces including a surface on said collar forming a variable orifice in series with said constant orifice, said passageway and the other end of said engine cylinder to reduce the flow through said flow chamber and constant orifice in response to an increase in pressure of fluid against the smaller area of said engine piston, said collar having a greater effective area on one end than on the other whereby uniform pressure in said flow chamber biases said flow control collar for movement in a direction to open said variable orifice, and high pressure on the smaller effective area of said control collar overcomes the bias and moves said control collar in a direction to reduce said variable orifice and means on said valve body against which said collar exerts its bias for urging said valve body into position for connecting said escape conduit to said duct.

16. A flow directing and control means for a hydraulic engine having an engine cylinder, and an engine piston in said cylinder, said engine piston having a greater effective area on one side than on the other whereby equal operating pressures on its two faces cause movement thereof in one direction, a valve housing having spaced valve forming parts, a pressure fluid conduit and an escape conduit leading to said housing, a duct leading to one end of said engine cylinder, a reciprocable valve body having parts cooperating with said valve forming parts for alternatively connecting said pressure and escape conduits to said duct, a passageway between said pressure fluid conduit and the other end of said engine cylinder and including a flow chamber surrounding a portion of said valve body, a control collar reciprocable on said valve body within said flow chamber, cooperating surfaces on said collar and on the walls of said flow chamber forming a constant orifice connecting said chamber with the other end of said engine cylinder and establishing a normal rate of flow of fluid through said flow chamber, cooperating valving surfaces on said collar and on the walls of said flow chamber forming a variable orifice in series between said constant orifice and the pressure fluid end of said passageway, said collar having a greater effective area on one end than on the other whereby uniform pressure in said flow chamber biases said control collar for movement in a direction to open said variable orifice, and high pressure on the smaller effective area of said control collar overcomes the bias and moves said control collar in a direction to reduce said variable orifice and means on said valve body against which said collar exerts its bias for urging said valve body into position for connecting said escape conduit to said duct.

17. In a fluid operated downwell pump comprising a pump cylinder, an engine cylinder longitudinally displaced from said pump cylinder, connected pistons operating in the respective pump and engine cylinders, said engine piston having a greater effective area on one side than on the other whereby equal operating pressures on its two faces cause movement thereof in one direction, and a source of operating fluid under pressure, the improvement comprising valve means to direct the flow and release of operating fluid to said engine cylinder, said valve means including a differential area collar subject to the pressure of operating fluid on its larger area and to the pressure of fluid exerted against the smaller area of said engine piston on its smaller area.

References Cited in the file of this patent

UNITED STATES PATENTS

| Number | Name | Date |
|---|---|---|
| 245,777 | Brazelle | Aug. 16, 1881 |
| 539,339 | Breitenstein | May 14, 1895 |
| 2,195,208 | Cornelius | Mar. 26, 1940 |